(12) United States Patent
Johns

(10) Patent No.: US 10,267,968 B2
(45) Date of Patent: Apr. 23, 2019

(54) LIGHTING AND COMMUNICATION SYSTEM FOR CONFINED SPACE

(71) Applicant: Tubemaster, Inc., Louisville, KY (US)

(72) Inventor: Clifford L Johns, Plano, TX (US)

(73) Assignee: Tubemaster, Inc., Louisville, KY (US)

( * ) Notice: Subject to any disclaimer, the term of this patent is extended or adjusted under 35 U.S.C. 154(b) by 0 days.

(21) Appl. No.: 15/840,317

(22) Filed: Dec. 13, 2017

(65) Prior Publication Data

US 2018/0172892 A1 Jun. 21, 2018

Related U.S. Application Data

(60) Provisional application No. 62/434,442, filed on Dec. 15, 2016.

(51) Int. Cl.
*H04B 10/25* (2013.01)
*F21V 8/00* (2006.01)
*H04B 10/00* (2013.01)

(52) U.S. Cl.
CPC .......... *G02B 6/0005* (2013.01); *G02B 6/001* (2013.01); *H04B 10/14* (2013.01); *H04B 10/25* (2013.01)

(58) Field of Classification Search
CPC ...... G02B 6/0005; G02B 6/001; H04B 10/14; H04B 10/25

USPC .......................................................... 398/109
See application file for complete search history.

(56) References Cited

U.S. PATENT DOCUMENTS

| | | | |
|---|---|---|---|
| 5,050,047 A * | 9/1991 | Viner | F21V 21/30 362/125 |
| 6,628,868 B2 * | 9/2003 | Akira | G02B 6/4296 355/30 |
| 2010/0284201 A1 * | 11/2010 | Alasaarela | G02B 6/0008 362/551 |
| 2016/0150200 A1 * | 5/2016 | Saka | G03B 21/005 353/31 |
| 2018/0172978 A1 * | 6/2018 | Hu | G02B 26/00 |

* cited by examiner

*Primary Examiner* — Don N Vo
(74) *Attorney, Agent, or Firm* — Duncan Galloway Egan Greenwald, PLLC; Theresa Camoriano; Guillermo Camoriano

(57) ABSTRACT

A communications arrangement includes incoming and outgoing fiber optics cables, each having one end inside a confined space and another end outside of the confined space, with the incoming fiber optics cable transmitting light from outside of the confined space, to inside the confined space, through a gap and through a movable filter to the outgoing fiber optics cable, such that a user inside the confined space can transmit signals from inside the confined space to outside of the confined space by moving the movable filter.

10 Claims, 2 Drawing Sheets

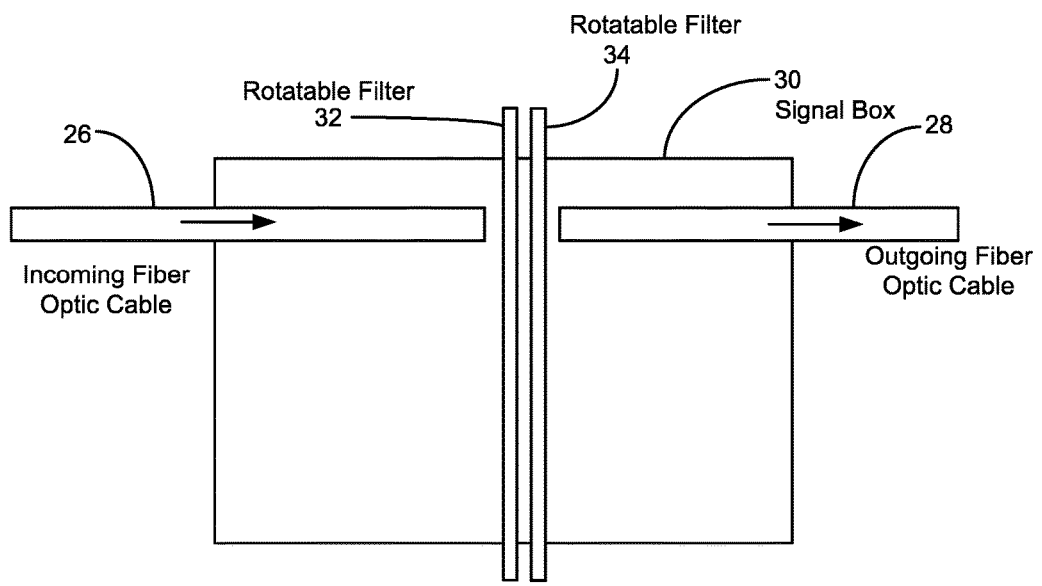
Fig 2
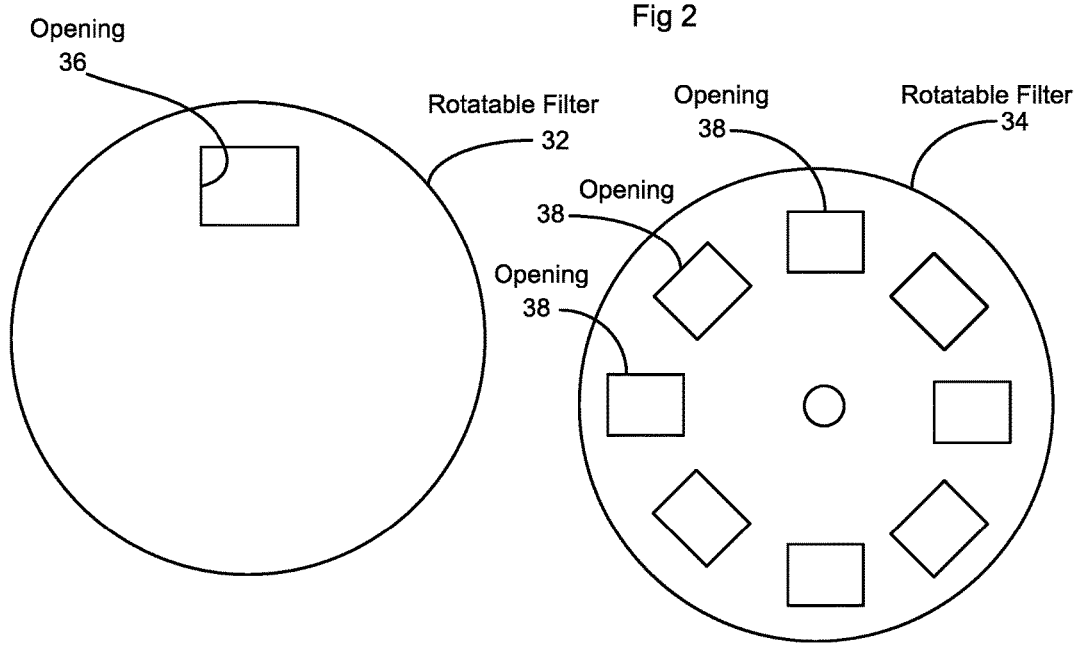
Fig 3
Fig 4

LIGHTING AND COMMUNICATION SYSTEM FOR CONFINED SPACE

This application claims priority from U.S. Provisional Application Ser. No. 62/434,442 filed Dec. 15, 2016, which is hereby incorporated herein by reference.

BACKGROUND

The present invention relates to a lighting and communication system for a confined space.

According to OSHA, a confined space is a space that is large enough for workers to enter and perform certain jobs. It has limited or restricted means for entry or exit and is not designed for continuous occupancy. Confined spaces include tanks, vessels, silos, storage bins, hoppers, vaults, pits, manholes, tunnels, equipment housings, ductwork, pipelines, etc. A confined space may have the potential to contain a hazardous atmosphere, may contain material that has the potential to engulf an entrant, or may contain other hazards.

In many confined spaces, it is desirable to eliminate the possibility of a spark or excessive heat, which could cause an explosion or fire. At the same time, most of the time that workers are in confined spaces, they need some form of artificial lighting, which typically introduces an electrical current that could create a spark or that generates heat that could cause a fire or injure a worker. This is a problem which typically requires the use of electrically intrinsically safe devices which are expensive, heavy, and bulky.

Another problem in confined spaces is that it often is difficult to communicate, due to noise, reduced visibility, cramped surroundings, impeded line-of-sight, and other issues.

SUMMARY

The present invention provides an arrangement that provides illumination within a confined space and provides two-way communication between a remote location and the confined space without introducing an ignition source into the confined space such as batteries, electrical wires, or any other source that could create a spark or generate heat which could ignite combustible materials. Since there is no electricity involved inside the confined space, there is no need for intrinsically safe communication or illumination devices. Furthermore, the communication does not require direct line-of-sight, and it is unaffected by the noise level or by entrants who may also be wearing hearing protection and other personnel protective equipment in the confined space.

BRIEF DESCRIPTION OF THE DRAWINGS

FIG. 2 is an enlarged view of the signal box in FIG. 1;

FIG. 3 is a front view of filter 1 of FIG. 2; and

FIG. 4 is a front view of filter 2 of FIG. 2.

DETAILED DESCRIPTION

Figure 1:
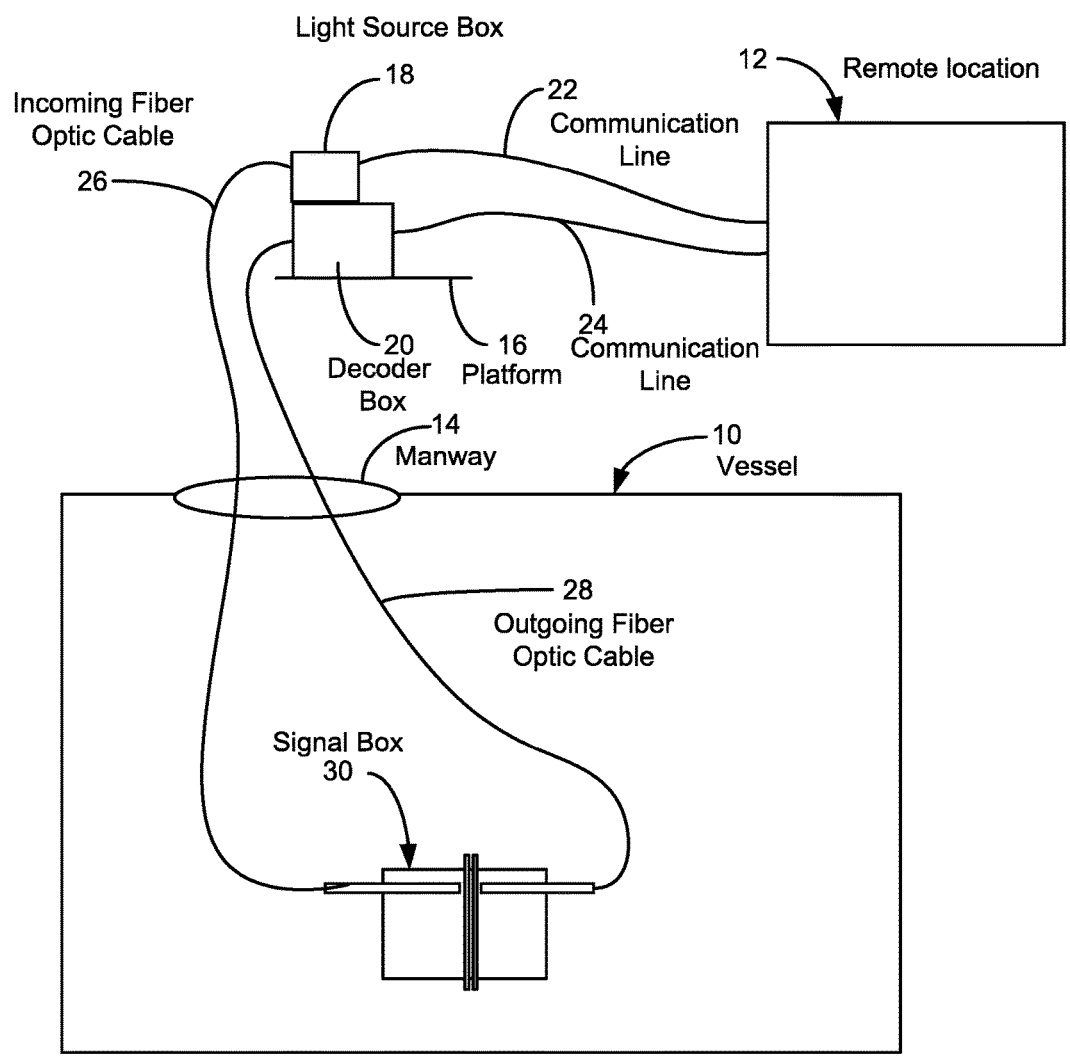
FIG. 1 is a schematic of a communications system for communicating between a confined space and a remote location.

FIG. 1 shows a confined space 10 and a remote location 12. As an example, the confined space 10 may be a chemical reactor vessel, and the remote location 12 may be a control room for controlling the reactor. During shutdown, a manway 14 on the reactor vessel 10 is opened, and people enter into the vessel 10 through the manway 14 to clean, repair, change out catalyst, and perform other maintenance procedures inside the confined space of the reactor vessel.

There is a platform 16 adjacent to the reactor vessel 10, and a person is located on the platform 16 at all times during the shutdown to monitor the people going into and out of the vessel and to perform other functions as a confined space attendant. On the platform 16, just outside of the manway 14, also are located a light source box 18 and a decoder box 20, which communicate with the remote location 12 through communication lines 22, 24, which extend from the remote location 12 to the light source box 18 and the decoder box 20, respectively.

The light source box 18 contains a light source and filters (not shown), which provide a source of light to the outside end of an incoming fiber optic cable 26, which extends its outside end at the light source box 18, through the manway 14, into the interior of the confined space 10, to its inside end at a signal box 30 inside the confined space 10. This incoming fiber optic cable 26 is a side-light emitting cable 26, which emits light out through the side of the cable 26 to illuminate the interior of the confined space 10. This incoming fiber optic cable 26 also may be used to provide signals to the people working inside the confined space 10. For example, the remote location 12 may send a signal to the light source box 18 to change the filter in the light source box 18 so that the color of the light transmitted to the outside end of the incoming fiber optic cable 26 is changed. (Alternatively, different colored light sources could be used, and the remote location 12 may send a signal to turn off one color of light source and turn on another color of light source.) The remote location 12 also may send a signal to the light source box 18 to cause the light source in the light source box 18 to flash. The change in color and flashing of light will be seen by everyone inside the confined space 10, regardless of whether they are in direct line-of-sight or not, since they are relying on the incoming fiber optic cable 26 to provide them area illumination.

A pre-established set of codes is taught to the workers who enter the confined space 10, so they will understand the meaning of the light signals that are being sent to them through the incoming fiber optic cable 26. For example, a flashing red light may mean that the workers should perform an orderly shutdown of their operations and exit the confined space 10. A solid red light may mean that the workers should exit (evacuate) the confined space 10 as rapidly as possible. A green light may mean that a delivery of supplies is arriving at the manway 14, a flashing green light may mean that the supplies are entering the confined space 10, and so forth.

An outgoing fiber optic cable 28, which preferably is an end light cable, has its inside end inside the signal box 30 inside the confined space 10, and extends out the manway, to its outside end located at the decoder box 20, outside of the confined space 10. In this embodiment, the decoder box 20 is located on the platform 16. The decoder box 20 includes a sensor, which senses the light signal coming into the decoder box 20 from the signal box 30 and sends a signal to the remote location 12 indicating the light signal that is being received. The decoder box 20 also may include a processor, which receives the signal from the sensor and interprets the signal, or there may be a processor at the remote location 12 that receives and interprets the signal, or there may simply be a person at the remote location who watches the outgoing fiber optic cable 28 and interprets the signal himself. It is preferred that there be a processor at the decoder box 20 or at the remote location 12 to interpret the light signal coming from the second fiber optic cable 28 and to generate sounds, flashing lights or other outputs that can be sensed by the operator, as desired.

Referring to FIG. 2, the signal box 30 inside the confined space 10 holds the inside ends of the incoming fiber optics cable 26 and the outgoing fiber optics cable 28 in alignment with each other and defines a short gap between those inside ends. The incoming fiber optics cable 26 selectively transmits light through the short gap to the inside end of the outgoing fiber optics cable 28. There are two filters 32, 34, which are rotatably mounted in the gap. The first filter 32 (see FIG. 3), is an "on-off" filter. It has an opening 36, which allows light to pass through, and the rest of the first filter 32 blocks light from passing through. The second filter 34 (see FIG. 4) has several openings 38 with filters of various colors, including an opening that allows all light to pass through, an opening with a green filter, an opening with a red filter, an opening with a yellow filter, and so forth. The user manually rotates the first and second filters 32, 34 to transmit the desired signal from the incoming fiber optics cable 26, through the filters 32, 34, through the gap, through the outgoing fiber optics cable 26, and to the decoder box 20, which communicates with the remote location 12. The first filter 32 is normally rotated to the "off" position, wherein the opening 36 does not line up with the inner end of the incoming fiber optics cable 26, thereby preventing light from passing through to the inner end of the outgoing fiber optics cable 28. When the worker wants to send a signal, he first rotates the second filter 34 to align the desired colored opening 38 with the inside ends of the incoming and outgoing fiber optics cables 26, 28, and then rotates the first filter 32 to allow the light to pass through the opening 36 of the first filter and through the correspondingly aligned filtered opening 38 in the second filter 34 to determine the color of light that travels out of the confined space 10 along the outgoing fiber optics cable 28 and on to the decoder box 20.

Again, the worker outside the confined space 10 would be trained to know what each signal means. A constant white light would mean one thing. A flashing white light (with the worker inside the confined space 10 rotating the first filter 32 on and off repeatedly) would mean something else. The various other colors in solid and flashing form will have other meanings. A certain sequence of colors may have other meanings. The sensor at the decoder box 20 will sense the light signals coming from the signal box 30 and will transmit that information to the processor, which will interpret the signal based on a predefined code. For example, a solid white light may mean that there is an emergency inside the confined space 10, which requires an immediate evacuation. A flashing yellow light may mean the person inside the confined space 10 is requesting delivery of certain supplies, and so forth.

While FIG. 1 shows hard-wired communication lines 22, 24 communicating between the remote location 12 and the decoder box 20 on the platform 16; that communication alternatively could be accomplished by wireless transmission, such as by radio waves. While FIG. 1 shows the same incoming fiber optics cable 26 being used to illuminate the confined space 10 and to provide the light source for the signal box 30, in an alternative embodiment, the light source for the illumination of the confined space 10 and the light source for the signal box 30 could be provided by two separate incoming fiber optics cables. While the filters 32, 34 are shown as being rotatably mounted, they could be mounted in an alternative way, such as being linearly arranged and mounted for linear movement along a linear track. An alternative arrangement may have only a single filter 34 defining a plurality of openings 38, with each opening having a different colored filter pane. The operator would then simply rotate or slide the filter 34 to align the desired opening 38 with the ends of the incoming and outgoing fiber optics cables 26, 28 in order to transmit a pre-arranged message back to the decoder box 20. It will be understood that various other modifications may be made to the embodiments described above without departing from the scope of the present invention as claimed.

What is claimed is:

1. A communication system for communication between a remote location and a confined space, comprising:
   an incoming fiber optics cable and an outgoing fiber optics cable, each of said incoming and outgoing fiber optics cables having an outside end located outside of said confined space and an inside end located inside said confined space;
   a signal box located inside said confined space, said signal box aligning said inside end of said incoming fiber optics cable with said inside end of said outgoing fiber optics cable, and defining a gap between said inside ends of said incoming and outgoing fiber optics cables;
   a movable filter located in said gap;
   a light source located outside of said confined space which provides light to said outside end of said incoming fiber optics cable such that said light is transmitted along said incoming fiber optics cable to said inside end of said incoming fiber optics cable, and such that selective positioning of said movable filter provides for selective transmission of said light from said inside end of said incoming fiber optics cable, through said movable filter, to said inside end of said outgoing fiber optics cable, along said outgoing fiber optics cable, to a location outside of said confined space.

2. A communication system as recited in claim 1, wherein said communication system does not use any electricity inside said confined space.

3. A communication system as recited in claim 1, wherein said incoming fiber optics cable also provides area lighting inside said confined space.

4. A communication system as recited in claim 3, wherein said communication system does not use any electricity inside said confined space.

5. A communication system as recited in claim 1, and further comprising a sensor located outside of said confined space which senses the light signal that is transmitted along said outgoing fiber optics cable and communicates with a processor, which processes said communication from said sensor and produces an output that can be sensed by a human located outside of said confined space.

6. A communication system as recited in claim 5, wherein said communication system does not use any electricity inside said confined space.

7. A method for two-way communication between a location outside of a confined space to a location inside a confined space, comprising:
   providing a light source located outside of said confined space;
   providing an incoming fiber optics cable and an outgoing fiber optics cable, each of said fiber optics cables having an outside end located outside of said confined space and an inside end located inside said confined space;
   transmitting light from said light source through said incoming fiber optics cable; and selectively transmitting said light from said incoming fiber optics cable to said outgoing fiber optics cable through a manually operated filter located inside said confined space.

8. A method for two-way communication between a location outside of a confined space to a location inside a confined space as recited in claim 7, and further comprising the step of selectively varying said light source in order to send a signal to the inside of said confined space, wherein the step of selectively varying said light source is selected from the group consisting of selectively changing the color of said light source and selectively flashing said light source on and off.

9. A method for two-way communication between a location outside of a confined space and a location inside a confined space, comprising:
   providing a light source located outside of said confined space;
   providing an incoming fiber optics cable and an outgoing fiber optics cable, each of said fiber optics cables having an outside end located outside of said confined space and an inside end located inside said confined space;
   transmitting light from said light source through said incoming fiber optics cable; and
   selectively transmitting said light from said incoming fiber optics cable to said outgoing fiber optics cable through a manually operated filter located inside said confined space, wherein said method for two-way communication does not use any electricity inside said confined space.

10. A method for two-way communication between a location outside of a confined space and a location inside a confined space as recited in claim 9, and further comprising the step of selectively varying said light source in order to send a signal to the inside of said confined space, wherein the step of selectively varying said light source is selected from the group consisting of selectively changing the color of said light source and selectively flashing said light source on and off.

\* \* \* \* \*